(12) United States Patent
Shen et al.

(10) Patent No.: US 10,781,535 B2
(45) Date of Patent: Sep. 22, 2020

(54) METHOD FOR PREPARING HIGHLY CUT-RESISTANT ULTRAHIGH MOLECULAR WEIGHT POLYETHYLENE (UHMWPE) FIBER AND USE THEREOF

(71) Applicant: JIANGSU JONNYMA NEW MATERIALS CO., LTD, Jiangsu (CN)

(72) Inventors: Wendong Shen, Beijing (CN); Qingren Zhu, Anhui (CN); Qingqing Chen, Jiangsu (CN)

(73) Assignee: JIANGSU JONNYMA NEW MATERIALS CO., LTD, Jiangsu (CN)

( * ) Notice: Subject to any disclaimer, the term of this patent is extended or adjusted under 35 U.S.C. 154(b) by 425 days.

(21) Appl. No.: 15/120,124

(22) PCT Filed: Mar. 11, 2015

(86) PCT No.: PCT/CN2015/073974
§ 371 (c)(1),
(2) Date: Aug. 19, 2016

(87) PCT Pub. No.: WO2016/041326
PCT Pub. Date: Mar. 24, 2016

(65) Prior Publication Data
US 2017/0058431 A1  Mar. 2, 2017

(30) Foreign Application Priority Data

Sep. 17, 2014 (CN) .......................... 2014 1 0474250

(51) Int. Cl.
*D01F 6/04* (2006.01)
*D01F 1/10* (2006.01)
(Continued)

(52) U.S. Cl.
CPC ......... *D01F 1/10* (2013.01); *A41D 19/01505* (2013.01); *D01D 1/02* (2013.01);
(Continued)

(58) Field of Classification Search
CPC .... D01F 1/10; D01F 6/04; D01D 5/06; D01D 1/02; D02G 3/442; B82Y 30/00
(Continued)

(56) References Cited

U.S. PATENT DOCUMENTS

2011/0268962 A1* 11/2011 Rastogi ................... C08K 3/01
                                                              428/325
2012/0277088 A1* 11/2012 Mathers ................. B82Y 30/00
                                                              501/134

FOREIGN PATENT DOCUMENTS

CN              102341447 A * 2/2012 ............... C08K 3/01

* cited by examiner

Primary Examiner — Matthew D Matzek
(74) Attorney, Agent, or Firm — JCIPRNET

(57) ABSTRACT

The present invention discloses a highly cut-resistant ultrahigh molecular weight polyethylene fiber, made of a ultrahigh molecular weight polyethylene and an inorganic ultrafine micropowder having a nanocrystalline structural morphology, wherein the inorganic ultrafine micropowder is one of an oxide, carbide, and nitride of aluminium, titanium, silicon, boron, and zirconium, or a combination thereof, and has an average diameter of 0.1-300 μm and a content of 0.1-14% of the total weight of the fiber. The present invention further discloses a method for preparing a highly cut-resistant ultrahigh molecular weight polyethylene fiber, comprising: adding nanocrystalline silicon carbide particles to a solvent, and repeatedly grinding by a sand mill; adding a ultrahigh molecular weight polyethylene, and the silicon carbide nanoparticles to a solvent, and mixing until uniform by stirring by a homogenizer with high shear, to obtain a spinning solution; and subjecting the spinning solution to conventional gelation spinning, and extracting and hot drawing the gel filament spun, to obtain a composite fiber. In the present invention, by introducing the nanocrystalline ultrafine particles into the ultrahigh molecular weight polyethylene fiber, the composite fiber of ultrahigh molecular weight polyethylene/nanocrystalline ultrafine particles has a quite excellent cut-resistant performance.

13 Claims, 2 Drawing Sheets

(51) Int. Cl.
*D01D 5/06* (2006.01)
*D01D 1/02* (2006.01)
*A41D 19/015* (2006.01)
*D01D 5/04* (2006.01)
*D01D 5/12* (2006.01)
*D02G 3/44* (2006.01)
*B82Y 30/00* (2011.01)
*A41D 31/24* (2019.01)

(52) U.S. Cl.
CPC ............... *D01D 5/04* (2013.01); *D01D 5/06* (2013.01); *D01D 5/12* (2013.01); *D01F 6/04* (2013.01); *D02G 3/442* (2013.01); *A41D 31/24* (2019.02); *B82Y 30/00* (2013.01); *D10B 2501/041* (2013.01)

(58) Field of Classification Search
USPC ............. 977/773, 778, 779; 264/165, 171.1, 264/172.11, 172.17, 172.18, 176.1; 428/357, 364, 372, 402
See application file for complete search history.

METHOD FOR PREPARING HIGHLY CUT-RESISTANT ULTRAHIGH MOLECULAR WEIGHT POLYETHYLENE (UHMWPE) FIBER AND USE THEREOF

CROSS-REFERENCE TO RELATED APPLICATION

This application is a 371 application of an International PCT application serial no. PCT/CN2015/073974, filed on Mar. 11, 2015, which claims the priority benefit of China application serial no. 201410474250.9, filed on Sep. 17, 2014. The entirety of each of the above-mentioned patent applications is hereby incorporated by reference herein and made a part of this specification.

TECHNICAL FIELD

The present invention relates to a highly cut-resistant ultrahigh molecular weight polyethylene (UHMWPE) fiber.

The present invention further relates to a method for preparing the highly cut-resistant UHMWPE fiber, and use thereof, which falls within the technical field of high-performance fibers.

BACKGROUND

For protection against the injury from sharp objects in particularly the circumstance of overspeed sports and emergency events, the research and development of a highly cut-resistant fiber and products braided therefrom (for example, various military and civilian facilities, clothes, hats, gloves and footmuff) persistently receive great attention in the industry worldwide. Due to the wide scope of use, the production and development have been carried out by manufacturers abroad, and the patents relating to the production thereof mostly concerns methods for braiding a cut- and piece-resistant end product using the fibers. There are comparatively few reports about the bulk fiber in terms of the cut resistance and abrasion tolerance. For example, as described in JP 2012-285840, CN 203021719U, U.S. Pat. No. 6,155,084, and EP-A-445872, the products are fabricated with largely high-strength organic fibers (for example, ultrahigh molecular weight polyethylene, polyamides with highly symmetric structure, polybenzoxazole, and other fibers) that are braided with glass fibers and inorganic metal wires in the form of warps and wefts or at different angles in a product braiding stage, or by laminating several layers of braided products having different performances. The products have an obvious cut-resistant effect, but are undesirable for use in contact with human body due to the hard and strong discomfort feeling. Furthermore, the steps in the fabrication process are troublesome, and the cost is high. Moreover, for example, cut-resistant gloves produced by GIMBELG (US), are composed of 9 layers of cut-resistant networks that can move relative to each other. Among the cut resistant products of various protection levels produced by HIGHMARK (UK), those with high protection levels comprise a liner made of stainless steel material. Furthermore, the protective clothing developed by International CRIMINOLOGY (US) has a multi-layer structure in which the layers are bound together by suturing or hot bonding and is also reinforced by impregnating with a thermoplastic resin or an epoxy resin, but similarly suffers from the above problems.

The patents concerning the improvement of the cut resistance of the starting fibers as raw material include CN102828312A, JP2004-19050, WO2008/046476, CN102037169A, CN102227524A, and others, where high molecular weight polyethylene, polyamides with highly symmetric structure, polybenzoxazole, and other high-strength fibers are frequently used to form, together with inorganic metals or glass fibers, composite fibers in the form of core/sheath, clad with highly elastic fibers, or coated with hard mineral powder particles, to achieve the purpose of improving the cut resistance. However, the addition of the organic metals and glass fibers results in a hard and discomfort body feeling. The Patent No. CN 102037169A (TOYOBO) discloses a network structure that is formed from cross-linking of a low molecular weight (50,000-300,000) polyethylene with a cross-linking agent in the presence of a free radical initiator. However, the process is melt spinning, in which the management to form a cross-linked gel at high temperature is difficult in process operations (see references 1 and 2), and the product needs to be clad with staple fibers subsequently. The Patent No. CN 18092292 A (DuPont) disclosed a two-layer laminated composite knit fabrics, where the cut-resistant fibers are mainly blend fibers of generally known high-strength polyaromatics and branched polyethylene; however, the implementation of blend spinning is troublesome and complex, and the uniformity is difficult to be achieved during spinning. The Patent Nos. CN 101528998 A and 102277669 A (DSM) disclose a composite fiber comprising filaments and so-called staple fibers, where the staple fibers mainly used are chopped hard fibers having a certain aspect ratio, including glass fibers, mineral fibers or metal fibers. However, in this patent publication, the chemical properties of the hard fibers are not defined, and it is merely specified that the fibers are produced by generally known rotation technique or jet spinning, and have a diameter that is less than 25 μm, and an aspect ratio that is higher than 10. The fibers are ground into hard staple fibers. The process focuses on the improvement of the macroscopic size of the hard staple fibers, including the aspect ratio and the diameter. Then, the fibers are mixed and spun with a solution of ultrahigh molecular weight polyethylene (UHMWPE). In the process, the cut resistance of the UHMWPE fibers is obviously improved; however, the production process, the production cost, and particularly the size distribution of the hard staple fibers are difficult to be controlled. Particularly, when some longer hard fibers have a length that is greater than the diameter of the UHMWPE fibers, the stability of the spinning process of the solution is compromised, and the strength (including modulus and strength at breakage) and the performance of the composite fiber product during use are influenced. In this regard, the Patent No. CN 102227524 A (DSM) proposes to form a sheath-core structure by further cladding a polar polyaromatic amide fiber through simple ring spinning. As described above, the produced cut-resistant filament is the core. This improvement has an effect to some extent; however, the process is still limited to the improvement of the braided structure as described above, and particularly glass fibers have impact on human health.

Hitherto, in the patents above, a bulk comprising of high-strength and high-modulus UHMWPE and polyaromatic amide fibers with fundamental mechanical properties are generally utilized, which are combined with other hard fibers or organic elastic fibers, to produce composite fibers that are braided into gloves and other braided products when used in processing of end products, and find use in areas having high cut-resistance requirement according to the design requirement of a cut resistant product. The status of the art is that there are few researches and discussions on the mechanism underlying the cut resistance of the starting fibers, and suffers from the problem that the theory lags behind the practice, and the practice is lack of the guidance by the theory.

Furthermore, the inventions aiming at solve the problems above highlight the use of high-strength and high-modulus UHMWPE fibers. Although the fibers has an axial specific strength that is high than the steel yarn, the theory underlying the spinability and the implementation effect of the bulk UHMWPE fibers (with a level of cut resistance that is only about 2) that is required to have high strength and high cut resistance are unsatisfactory yet. Therefore, there is a need for a new technical solution to solve the above problems.

SUMMARY OF THE INVENTION

To address the technical problems above, the present invention provides a highly cut-resistant ultrahigh molecular weight polyethylene fiber.

The present invention further provides a method for preparing the highly cut-resistant ultrahigh molecular weight polyethylene fiber, and use thereof.

The following technical solutions are employed in the present invention.

A highly cut-resistant ultrahigh molecular weight polyethylene fiber is provided, which is made of a ultrahigh molecular weight polyethylene and an inorganic ultrafine micropowder having a nanocrystalline structural morphology. The inorganic ultrafine micropowder is one of an oxide, carbide, and nitride of aluminium, titanium, silicon, boron, and zirconium, or a combination thereof, and has an average diameter of 0.1-300 μm and preferably 200-500 nm, and a content of 0.1-14%, preferably 0.5-6%, and specifically 0.5%, 1%, 2%, 3%, 4%, 5% or 6% of the total weight of the fiber.

The inorganic ultrafine micropowder has a nanocrystalline structure that is of a hexagonal, tetragonal, or polygonal crystalline form, and has a percentage of total crystallinity that is greater than 95%.

The surface layer of the inorganic ultrafine micropowder needs to have one-dimensional nano-wire, nanorod, or nanobelt distribution of several nanometers in thickness, the structure of which corresponds to a distinct pattern of chemical bonding from that of the inorganic element atoms in the corresponding powder bulk, and the ratio of the atoms of the distinct pattern of chemical bonding to the bulk inorganic element atoms in the surface layer is 0.1-0.5, and preferably 0.15-0.35.

The ultrahigh molecular weight polyethylene fiber has a tensile strength of 17-23 cN/dtex and preferably 19-21 cN/dtex, and a tensile modulus of 700-900 cN/dtex and preferably 750-850 cN/dtex.

The composite fiber may be prepared following the method provided hereinafter. To illustrate the composite fiber provided in the present invention, an example is given in the embodiment in which the composite fiber is prepared by mixing a nanocrystalline silicon carbide powder with a linear ultrahigh molecular weight polyethylene and then undergoing gelation spinning.

A method for preparing a highly cut-resistant ultrahigh molecular weight polyethylene fiber is provided, which includes the steps of (1) using a nanocrystalline silicon carbide micropowder as an inorganic ultrafine micropowder, where a 2-5 nm thick surface layer of the nanocrystalline silicon carbide particles has a silicon-oxygen chemical bonding pattern via a number of silicon-oxygen bonds Si2p-O, the ratio [Si2p-O/Si2p-C] of this pattern to the bonding pattern via silicon-carbon bonds Si2p-C is 0.24, and the value is calculated by Formula (1): [Si2p-O/Si2p-C]=ISi-o/ISi-c;

(2) dispersing the nanocrystalline silicon carbide particles and a dispersing agent in a ultrahigh molecular weight polyethylene powder by high-shear blending;

(3) ultrasonically dispersing a powder premix prepared with 88-99.5 parts by weight of the ultrahigh molecular weight polyethylene and 0.5-12 parts by weight of the silicon carbide nanoparticles uniformly into a solvent at a certain ratio, and mixing until uniform by stirring for 2-4 hrs by a homogenizer with high shear at a speed of 1000-3000 r/min, to obtain a 6-8.5 wt % spinning solution; and (4) subjecting the spinning solution to gelation spinning at a temperature of 230-280° C. and specifically 250° C., and extracting and hot drawing the gel filament spun after the step of spinning, to obtain a composite fiber.

The ultrahigh molecular weight polyethylene has a molecular weight of $4 \times 10^6$ g/mol-$8 \times 10^6$ g/mol, and preferably $5 \times 10^6$ g/mol-$6 \times 10^6$ g/mol.

The silicon carbide nano particles have an average diameter of 0.1-300 nm and preferably 200-500 nm.

The solvent is one or more of white oil, paraffin oil, decalin, and mineral oil, and has a viscosity of 40-100 Cst at 40° C.

Use of the highly cut-resistant ultrahigh molecular weight polyethylene fiber as a cut-resistant material is also disclosed.

The cut-resistant material is cut-resistant gloves.

Specific description is given below.

During the gelation spinning of UHMWPE, nanocrystalline particles having a nano-structural morphology of titanium, aluminium, silicon, and boron oxide, carbide, and nitride are introduced. The inorganic nanocrystalline particles may be prepared from simple substance or compounds of different elements through well known vapor deposition, arc discharging, sol-gel process, or carbothermal reduction, and the phase structure should be triclinic, tetragonal, hexagonal, or polygonal. Moreover, the surface of the nanocrystalline particles has, in several nanometers in thickness, a distinct pattern of chemical bonding from that of the atoms in the particulate powder bulk, and the ratio of the atoms of the distinct pattern of chemical bonding to the bulk inorganic element atoms in the surface layer is 0.1-0.5, and preferably 0.15-0.35. The distinct pattern of chemical bonding of the elements in the surface layer can be determined by X-ray photoelectron spectroscopy (XPS) or Auger electron spectroscopy (AES). In this application, XPS is exemplarily used, as described hereinafter.

UHMWPE has a linear continuous polyethylene chain, and may also have 0.005-0.1 mol % of an α-olefin copolymer chain, and has a viscosity average molecular weight of 4,000,000-8,000,000. By formulating a UHMWPE solution to be gelation spun, the nanocrystalline particles enter the UHMWPE solution and bring into contact with the interface of the lamellar phase of gel, to facilitate the continuous UHMWPE chain to have a hexagonal or monoclinic straightened chain after multiple draw orientations, which is critical to the ultrahigh strength manifested by the UHMWPE fiber. However, the strength is in a one-dimensional direction (C-axis), and correlates with the weak interchain or inter-crystalline-phase interaction in a direction perpendicular to the C-axis of crystallization of the straightened UHMWPE chain, and the anti-cracking performance and the cut resistance are poor. Therefore, interchain chemical cross-linking bridge or cladding with other staple fibers are used in previous (foresaid) patents, which however bring about other negative impacts as described above. Accordingly, particular nanocrystalline particles are used in the present invention, which automatically enter and are integrated with the interface of the hexagonal or monoclinic UHMWPE fiber finally with the multiple ultradraw orientations. This increases not only the cut resistance of the UHMWPE fiber, but also the stability of the gelation spinning process, which can facilitate the improvement of the production efficiency.

Grinding groove-related abrasion resulting from grinding and cutting and breakage-related abrasion resulting from the propagation of local cracks are the causes of the cut damage of the cut-resistant fiber and products braided therefrom (according to the test mechanism provided in national standard GB24541-2009, ISO13997, NSS339, and European standard EN388). It is recognized that the former corresponds to a quite short time (associated with the hardness) and the later corresponds to a longer relaxation timescale (macroscopically manifesting plasticity), as investigated from the perspective of the micromolecular relaxation time of the material. In the solution of the present invention, the object is accomplished with a combination of the nanocrystalline particles and the UHMWPE fiber. The nanocrystalline particles mentioned in this application are materials with a high hardness and the relaxation time of the UHMWPE backbone is quite long (References 1 and 2), such that the fiber has a unique advantage in the axial resistance to crack propagation, and in the direction (a\b) perpendicular to the axial direction of the UHMWPE fiber, interchain crosslinking bridges are provided by distinct patterns of chemical aggregation existing on the surface layer of the nanocrystalline particles, whereby the strength in the direction is modulated and reinforced.

The technical solution of the present invention is further described as follows.

The nanocrystalline ultrafine particles mentioned above are practically composite particles of corresponding nano-sale crystal produced in situ with the inorganic oxide, carbide, and nitride. For example, the crystalline phase of SiC particles is formed by continuously forming stacked SiC nucleus at high temperature from the gas-liquid-solid reaction of the raw materials $SiO_2$ and C, and then continuously growing along a C-axis that is perpendicular to the a/b axis of the six-membered ring plane of SiC, to form a hexagonal system. Depending on the reaction conditions, SiC nano wires, rods, sheets, and other morphologies may be formed. The hexagonal system has different coefficients of thermal expansion in the c- and a-axial directions (which correspond to +, and − respectively), and is anisotropic. Meanwhile, in a late stage of the reaction, part of the gaseous SiO is gradually accumulated in the "defects" formed by the whisker on the surface of the crystal due to the dislocation of the six-membered ring. The six-membered ring maintains a C-axis related growth (where the length is up to several tens of micrometers, and diameter is up to 100 nm), and a cellular SiO distribution along the grain boundary is exhibited. The silicon-oxygen bonds SiO (having a bond distance of 0.5 nm) attached onto the surface of the nanocrystalline SiC form a cubic or cage-like structure together with each other, and the dangling bond Si—O— on the apex of which is highly active and functions to reduce the coefficient of kinetic friction of the particle material. The applicant also finds that if the patterns of chemical bonding of the element on the surface layer of the nano-silicon carbide particles meet the above conditions, the silicon carbide particles have a macroscopic size (with the provision that the particle size is less than the diameter of the bulk fiber) and morphology that can vary in a wide range, which is advantageous. Because the silicon carbide particles used in the present invention are aggregate of nanocrystalline (wires, rods, and sheets) that may be smooth microspheres or polyhedrons having a macroscopic size (μm scale) that is highly selectable in a wide range. Therefore, in the present method, the particular nano-silicon carbide particles above are blended into the gelation spinning system of the UHMWPE solution, and automatically enter and are integrated with the interface of the hexagonal or monoclinic UHMWPE fiber with multiple ultradraw orientations, which is feasible through the molecular micro-scale dynamic interaction. The nanocrystalline SiC particles provide the "hardness", and some silicon-oxygen bonds SiO on the surface provide the network bridging bond between the PE chains to "anchor" the PE chain and the unfolded space of the lamellar crystal of the gel, through which the problem of propagation of local cracks can be effectively solved, and the formation of network bonds between the UHMWPE chains by means of hard fibers, chemical or radiation crosslinking (References 1, and 3) is avoided. Therefore, a solution having no negative problems in the spinning process is achieved. Further, the processing process is simple, energy saving and environmentally friendly as described hereinafter.

TECHNICAL REFERENCES

1) Q. R. Zhu et al. 13C-NMR Study of Crosslinking and Long-Chain Branching in Polyethlene Induced by 60Co Gamma Ray Irradiation at Different Temperatures (English) J. of Polym. Sci.: Part A: Polym. Chem., Vol. 28, 2741-51(1990).
2) Q. R. Zhu et al. $^{13}$C NMR Observation on Microscopic Network-like Structure in Cross-linked polymer. Chinese Journal of Chemical Physics. 4 (1989) 315.
3) Q. R. Zhu et al. The Effect of Irradiation on a Change in Quantity of Two Types of Radiation Induced Cross-Links in HDPE With Different Morphology. Journal of Radiation Research and Radiatice Processing, 8, 80-85(1990).

The present invention has the following technical benefits. In the present invention, the nanocrystalline ultrafine particles are introduced into the ultrahigh molecular weight polyethylene fiber, and the novel nanocrystalline aggregate material thus prepared is corresponding nanocrystalline aggregate with the bulk phase bring aluminium, titanium, silicon, boron, or zirconium oxide, carbide, or nitride, which has a surface layer with a structural morphology that has, in several nanometers in thickness, distinct patterns of chemical bonding corresponding to the inorganic element and forming a one-dimensional nano-wire, nanorod, nanobelt distribution on the surface layer. The nanocrystalline particles having such a structural morphology introduced in the gelation spinning process of UHMWPE have the functions of cut resisting, bridging, and others. Therefore, the composite fiber of ultrahigh molecular weight polyethylene/ nanocrystalline ultrafine particle has a quite cut resistance. Preliminary studies show that the composite fiber of ultrahigh molecular weight polyethylene/nanocrystalline ultrafine particle prepared by using the method has a tensile strength up to 21 cN/dtex, and a tensile modulus of 850 cN/dtex. The performance indices of gloves produced with the composite material attains the national standards and European standards, for example, GB 24541-2009, ISO 13997, NSS339, and EN388.

BRIEF DESCRIPTION OF ACCOMPANYING DRAWINGS

SPECIFIC EMBODIMENT

Figure 1:
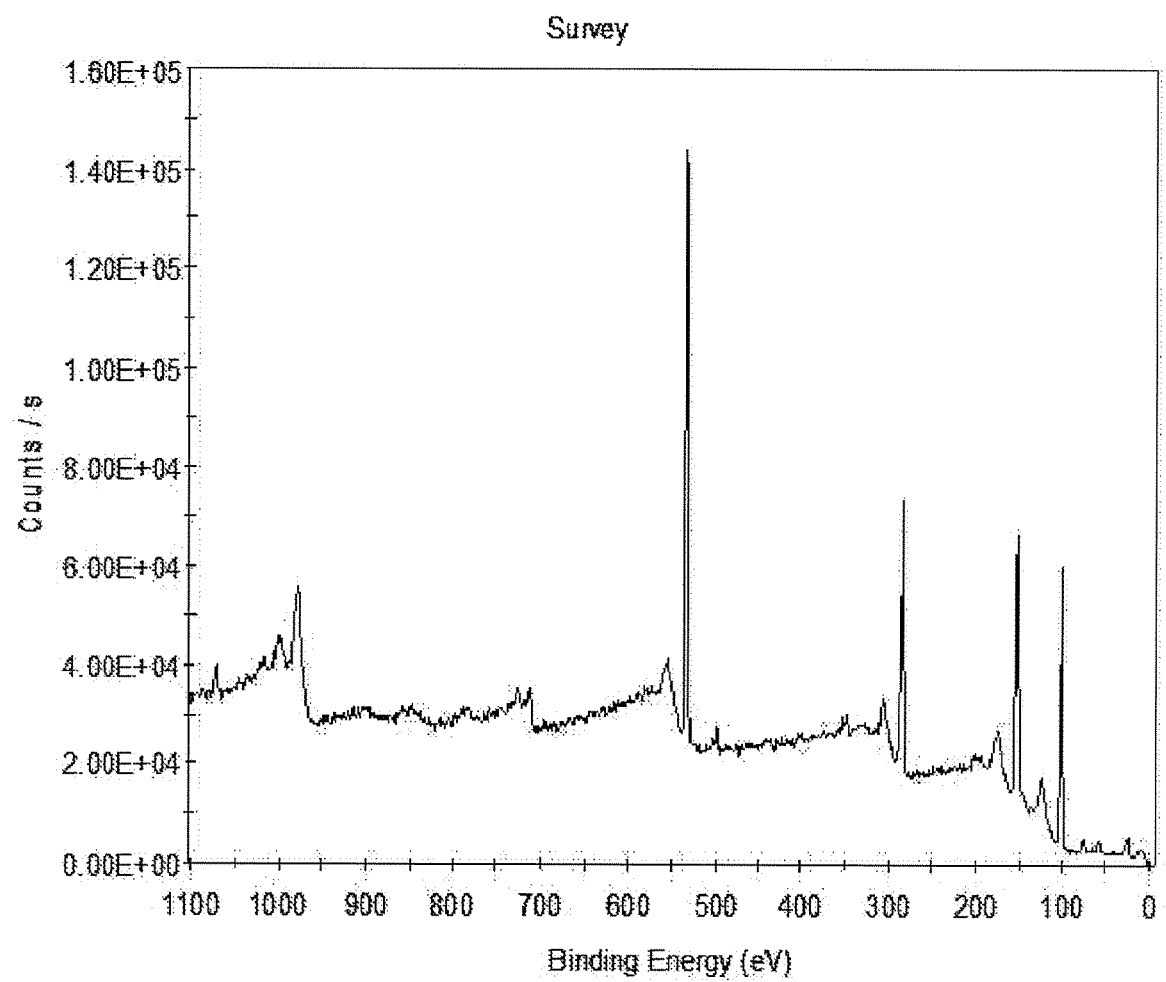
FIG. 1 is a survey scan XPS spectrum of silicon carbide used in the present invention.

The examples below are provided for merely illustrating, instead of limiting the protection scope of the present invention. The mechanical performance and thermal stability of the composite fiber prepared in example below are measured as follows in each case. The tensile strength and tensile modulus of the composite fiber are tested by a single fiber tensile strength and elongation tester, and the thermal stability in nitrogen is determined by thermogravemetric analysis.

Example 1

1) 1 g of a nanocrystalline silicon carbide powder with a particle diameter of 200 nm and a ratio [Si2p-O/Si2p-C] of surface element chemical bonding patterns of 0.24, and an dispersing agent Tween-80/SA=9/1 (HLB=13.5, 0.1 g) were dispersed in an ultrahigh molecular weight polyethylene powder by high shear blending. The prepared powder premix was ultrasonically uniformly dispersed in mineral oil, and then the solution in mineral oil (where the weight ratio of silicon carbide to UHMWPE was 1:99) was slowly heated in a reactor with stirring by shear at a speed controlled to 75-3000 r/min, until the solution was uniformly mixed.

2) Gelation spinning: A composite solution of UHMWPE/nano-silicon carbide well dissolved was spun by gelation spinning at a temperature of 240° C., and the prepared gel filament was extracted and drawn, to obtain the composite fiber of the present invention.

The composite fiber prepared in the example has a nano-silicon carbide content of 1%, a tensile strength of 21 cN/dtex and a tensile modulus of 800 cN/dtex.

Example 2

1) 2 g of a nanocrystalline silicon carbide powder with a particle diameter of 200 nm and a ratio [Si2p-O/Si2p-C] of surface element chemical bonding patterns of 0.24 was dispersed in an ultrahigh molecular weight polyethylene powder by high shear blending. The prepared powder premix was ultrasonically uniformly dispersed in mineral oil, and then the solution in mineral oil (where the weight ratio of silicon carbide to UHMWPE was 2:98) was slowly heated in a reactor with stirring by shear at a speed controlled to 75-3000 r/min, until the solution was uniformly mixed.

2) Gelation spinning: A composite solution of UHMWPE/nano-silicon carbide well dissolved was spun by gelation spinning at a temperature of 240° C., and the prepared gel filament was extracted and drawn, to obtain the composite fiber of the present invention.

The composite fiber prepared in the example has a nano-silicon carbide content of 2%, a tensile strength of 20 cN/dtex, and a tensile modulus of 810 cN/dtex.

Example 3

Example 1 was repeated, except that the content of the nano-silicon carbide was 2 wt %, and the ratio [Si2p-O/Si2p-C] of element chemical bonding patterns on the surface of the nano-silicon carbide powder was 0.29.

Example 4

Example 2 was repeated, except that the ratio [Si2p-O/Si2p-C] of element chemical bonding patterns on the surface of the nano-silicon carbide powder was 0.34.

Example 5

Example 1 was repeated, except that the content of the nano-silicon carbide was 4 wt %, and the ratio [Si2p-O/Si2p-C] of element chemical bonding patterns on the surface of the nano-silicon carbide powder was 0.34.

Example 6

Example 1 was repeated, except that the content of the nano-silicon carbide was 4 wt %.

Comparative Example A

The components and the process were the same as those in Example 1, except that no nanocrystalline silicon carbide powder was added.

Comparative Example B

Example 2 was repeated, except that the content of the nano-silicon carbide was 3 wt %, and the ratio [Si2p-O/Si2p-C] of element chemical bonding patterns on the surface of the nano-silicon carbide powder was 0.10.

Comparative Example C

Example 2 was repeated, except that the content of the nano-silicon carbide was 4 wt %, and the ratio [Si2p-O/Si2p-C] of element chemical bonding patterns on the surface of the nano-silicon carbide powder was 0.60.

Use of the highly cut-resistant ultrahigh molecular weight polyethylene fiber as a cut-resistant material is provided below.

A method for producing cut-resistant gloves containing the composite fibers above includes cladding polyurethane filaments with a fiber cladding material and high-strength polyethylene fibers, where the fiber cladding material and the high-strength polyethylene fibers are clad respectively outside the polyurethane filaments in a forward and reverse direction.

The produced gloves have a reasonable structure, a high strength, and a high cut resistance, and achieves level 5 of protection authenticated internationally.

In the examples, the method for determining and evaluating the principal control data includes the following.

As exemplary detection and quantitative evaluation, the ratio [Si2p-O/Si2p-C] of two chemical bonding patterns of the element silicon in the surface layer of the nanocrystalline silicon carbide powder is determined by X-ray photoelectron spectroscopy (XPS).

The instrument used and conditions set: XPS Model (UK) Thermo ESCALAB 250.

Excitation source of X ray: monochromatic source Al Kα (hv=1486.6 eV); power 150 W, X-ray beam spot 500 μm;

Fixed transmitted energy of energy analyzer: 30 eV, scanning range: 0-1200 eV.

X-ray photoelectron spectroscopy (XPS) is based on the fact that the surface layer of a sample material is irradiated with a monochromatic X-ray source or electron beam, such that the electrons of the element atoms in the surface layer are excited to be emitted, and information of materials that are about several nanometers deep in the surface can be obtained by detecting the energy distribution and intensity of the excited electrons that are mainly associated with the electron orbit binding energy, whereby the species, state and relative content of the elements existing in the surface of the nano-silicon carbide powder can be qualitatively or quantitatively detected.

FIG. 1 is a survey scan XPS spectrum of silicon carbide used in the present invention. During the analysis of each peak in the spectrum and the analysis and calculation of the species, state and relative content of the elements existing in the surface of the nano-silicon carbide powder, the carbon peak C(1s)282.7 eV is used as an internal standard, and the remaining peaks are Si2p 100.62 eV, O1s 532.14 eV, Ca2p347.98 eV, Fe2p712.08 eV, and Na1s1072.65 eV.

Figure 2:
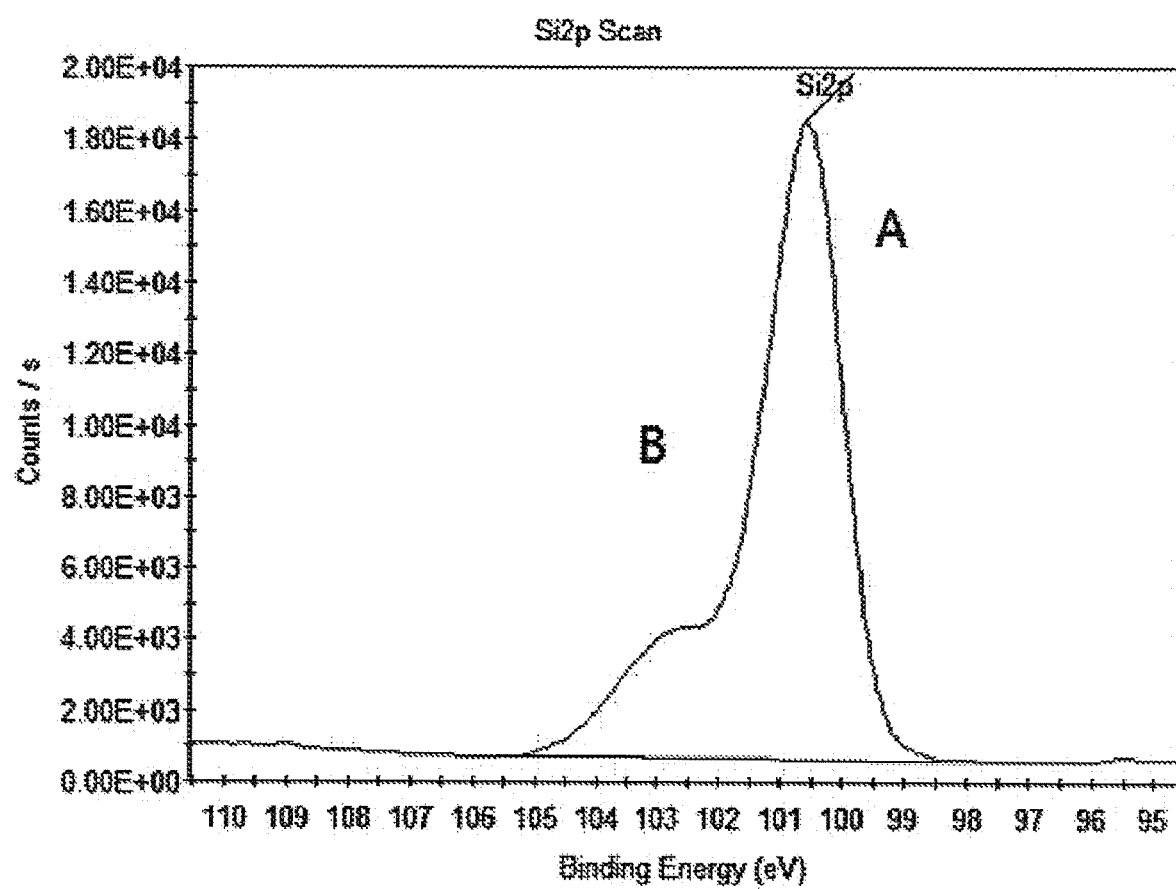
FIG. 2 is a narrow scan spectrum of binding energy with a Si2p97.85 eV-105.55 eV broad peak of the element Si.

FIG. 2 is a narrow scan spectrum of binding energy with a Si2p97.85 eV-105.55 eV broad peak of the element Si, showing that the Si2p peak of the element silicon of two chemical bonding patterns is split into doublet peaks A and B, the binding energy of 100.6 eV and 102.5 eV correspond respectively to Si—C and Si—O, the Si2p photoelectron binding energy of the later bond is increased by shifting 1.9 eV to a high binding energy, the Si2p photoelectron peak is two single Gaussian peaks (with Gaussian distribution) that are partially overlapped, and the intensity may be obtained through integration of the two peaks, which may be implemented by a computer. Assuming that the peak intensities (the area integrated is A and B respectively) of the binding energy (A) Si2p100.6 eV and (B) Si2p102.5 eV are $I_{Si-c}$ and $I_{Si-o}$ separately, the relative level of the chemical bonding patterns of the element in the surface of the nanocrystalline silicon carbide powder can be calculated by a formula below:

$$[Si2p\text{-}O/Si2p\text{-}C] = I_{Si\text{-}o}/I_{Si\text{-}c} = B/A \quad (1)$$

Cut-Resistance Test of Product

The test was conducted according to the national standard GB24541-2009 or the European standard EN388. According to the European standard EN388, a cut resistance tester was used to test the cut resistance of protofilaments (gloves), in which the apparatus was a tester manufactured by Sodemat according to the European standard EN388. The sample was positioned on a work bench of the cut resistance tester, below which an aluminium foil was padded and moved horizontally. A circular blade was rotated against the sample while advancing in a direction (at 180° with respect to) opposite to the movement direction of the sample. At the time point when the sample was completely cut off, the circuit blade was in contact with the padded aluminium foil and electrified, whereupon the circuit notified the counter of the termination of cutting. Throughout the whole process, the counter was persistently kept recording. As such, the cut resistance of the sample was obtained.

After test, the level of cut resistance was evaluated through comparison with that of a standard sample (that was a planar cotton fabric of 200 g/m2) tested under the same conditions. The test was started with the standard sample, and the cut test was conducted alternatively with the test sample and the standard sample. After the third test with the test sample, the fourth test with the standard sample was conducted, and then this round of test was ended.

A value is calculated according to a formula below, which is designated as cut resistance index:

N=(reading of the counter for the standard sample before the test of the test sample+reading of the counter for the standard sample after the test of the test sample)/2; Index= (reading of the counter for the test sample+N)/N The level is scaled according to the index:

| Index | Level of cut resistance |
| --- | --- |
| 2.0-2.5 | 1 |
| 2.5-5.0 | 2 |
| 5.0-10 | 3 |
| 10.0-20.0 | 4 |
| >20 | 5 |

In addition, the circular blade used in the test is an L-type rotary cutter blade manufactured by OLFA having a diameter of 45 mm (which is made from SKS-7 tungsten steel, and has a thickness of 0.3 mm).

The table below shows test results of the fibers from the examples and comparative examples

| | Example 1 | Example 2 | Example 3 | Example 4 | Example 5 | Example 6 | Comparative Example A | Comparative Example B | Comparative Example C |
| --- | --- | --- | --- | --- | --- | --- | --- | --- | --- |
| Content of nanocrystalline SiC particles, % | 1 | 2 | 2 | 2 | 4 | 4 | 0 | 3 | 4 |
| B/A ratio of bonding patterns in the surface of SiC | 0.24 | 0.24 | 0.29 | 0.34 | 0.34 | 0.24 | — | 0.10 | 0.60 |
| Tensile strength, cN/dtex | 21 | 20 | 20.5 | 21 | 19.5 | 19 | 25 | 20.5 | 21 |
| Tensile modulus, cN/dtex | 800 | 810 | 810 | 810 | 820 | 820 | 900 | 820 | 820 |
| Level of cut resistance (end product) | 4-5 | 5 | 5 | 5 | 5 | 5 | 2 | 3-4 | 4-5 |

APPLICABILITY OF THE PRESENT INVENTION IN INDUSTRY

The ultrahigh molecular weight polyethylene fiber of the present invention and the braided gloves containing the fibers etc have excellent cut resistance and anti-abrasion performance, and have a high post processing passing rate and an increased productivity, thus being useful in various areas having high and strict requirement for protection performance (for example, sports, aviation, marine navigation, mining, oceanographic engineering, various military and civilian facilities, clothes, hats, gloves and footmuff), and contributing a lot to the industrial development and economic benefits.

The invention claimed is:

1. A highly cut-resistant ultrahigh molecular weight polyethylene fiber, comprising ultrahigh molecular weight polyethylene and an inorganic ultrafine micropowder having a nanocrystalline structural morphology, wherein the inorganic ultrafine micropowder is one of an oxide, carbide, and nitride of aluminium, titanium, silicon, boron, and zirconium, or a combination thereof, and the inorganic ultrafine micropowder has an average diameter of 0.1-300 μm and a content of 0.1-14% of the total weight of the fiber, the inorganic ultrafine micropowder is dispersed within the polyethylene fiber, wherein the inorganic ultrafine micropowder comprises nanocrystalline silicon carbide particles and one-dimensional nano-wire, nanorod, or nanobelt distribution of several nanometers in thickness attached on a surface of the nanocrystalline silicon carbide particles, wherein the nanocystalline silicon carbide particles comprise silicon-carbon bonds, and the one-dimensional nano-wire, nanorod, or nanobelt distribution of several nanometers in thickness comprises silicon-oxygen bonds;

wherein a proportion of the silicon-oxygen bonds to the silicon-carbon bonds ranges from 0.1:1 to 0.5:1 when the inorganic ultrafine micropowder is detected by X-ray photoelectron spectroscopy (XPS).

2. The highly cut-resistant ultrahigh molecular weight polyethylene fiber according to claim 1, wherein the inorganic ultrafine micropowder has a nanocrystalline structure that is of a hexagonal, tetragonal, or polygonal crystalline form, and has a percentage of total crystallinity that is greater than 95%.

3. The highly cut-resistant ultrahigh molecular weight polyethylene fiber according to claim 1, wherein the ultrahigh molecular weight polyethylene fiber has a tensile strength of 17-23 cN/dtex and a tensile modulus of 700-900 cN/dtex.

4. A method for preparing the highly cut-resistant ultrahigh molecular weight polyethylene fiber according to claim 1, comprising the steps of:

(1) using a nanocrystalline silicon carbide micropowder as an inorganic ultrafine micropowder, wherein a 2-5 nm thick surface layer of the nanocrystalline silicon carbide particles has a silicon-oxygen chemical bonding pattern via a number of silicon-oxygen bonds Si2p-O, the ratio [Si2p-O/Si2p-C] of this pattern to the bonding pattern via silicon-carbon bonds Si2p-C is 0.24, and the value is calculated by Formula (1): [Si2p–O/Si2p–C]=ISi-o/ISi-c;

(2) dispersing the nanocrystalline silicon carbide particles and a dispersing agent in a ultrahigh molecular weight polyethylene powder by high-shear blending;

(3) ultrasonically dispersing a powder premix prepared with 88-99.5 parts by weight of the ultrahigh molecular weight polyethylene and 0.5-12 parts by weight of the silicon carbide nanoparticles uniformly into a solvent at a certain ratio, and mixing until uniform by stirring for 2-4 hrs by a homogenizer with high shear at a speed of 1000-3000 r/min, to obtain a 6-8.5 wt % spinning solution; and (4) subjecting the spinning solution to gelation spinning at a temperature of 230-280° C., and extracting and hot drawing the gel filament spun after the step of spinning, to obtain a composite fiber.

5. The method for preparing the highly cut-resistant ultrahigh molecular weight polyethylene fiber according to claim 4, wherein the ultrahigh molecular weight polyethylene has a molecular weight of $4\times10^6$ g/mol-$8\times10^6$ g/mol.

6. The method for preparing the highly cut-resistant ultrahigh molecular weight polyethylene fiber according to claim 4, wherein the silicon carbide nanoparticles have an average diameter of 0.1-300 μm.

7. The method for preparing the highly cut-resistant ultrahigh molecular weight polyethylene fiber according to claim 4, wherein the solvent is one or more of white oil, paraffin oil, decalin, and mineral oil, and has a viscosity of 40-100 Cst at 40° C.

8. The highly cut-resistant ultrahigh molecular weight polyethylene fiber according to claim 1, wherein the highly cut-resistant ultrahigh molecular weight polyethylene fiber is included in a cut-resistant material.

9. The highly cut-resistant ultrahigh molecular weight polyethylene fiber according to claim 8, wherein the cut-resistant material is included in cut-resistant gloves.

10. The highly cut-resistant ultrahigh molecular weight polyethylene fiber according to claim 2, wherein the highly cut-resistant ultrahigh molecular weight polyethylene fiber is included in a cut-resistant material.

11. The highly cut-resistant ultrahigh molecular weight polyethylene fiber according to claim 10, wherein the cut-resistant material is included in cut-resistant gloves.

12. The highly cut-resistant ultrahigh molecular weight polyethylene fiber according to claim 3, wherein the highly cut-resistant ultrahigh molecular weight polyethylene fiber is included in a cut-resistant material.

13. The highly cut-resistant ultrahigh molecular weight polyethylene fiber according to claim 12, wherein the cut-resistant material is included in cut-resistant gloves.

* * * * *